United States Patent
Gagnon

(10) Patent No.: US 12,128,661 B2
(45) Date of Patent: Oct. 29, 2024

(54) MICRO EMBOSSING

(71) Applicant: Bixby International Corporation, Newburyport, MA (US)

(72) Inventor: Marc Gagnon, Exeter, NH (US)

(73) Assignee: Bixby International Corporation

( * ) Notice: Subject to any disclaimer, the term of this patent is extended or adjusted under 35 U.S.C. 154(b) by 247 days.

(21) Appl. No.: 17/351,729

(22) Filed: Jun. 18, 2021

(65) Prior Publication Data

US 2022/0016866 A1     Jan. 20, 2022

Related U.S. Application Data

(60) Provisional application No. 63/115,859, filed on Nov. 19, 2020, provisional application No. 63/052,554, filed on Jul. 16, 2020.

(51) Int. Cl.
| | |
|---|---|
| B32B 3/30 | (2006.01) |
| B29C 48/00 | (2019.01) |
| B29C 48/08 | (2019.01) |
| B29C 48/21 | (2019.01) |
| B29C 48/88 | (2019.01) |

(Continued)

(52) U.S. Cl.
CPC ............. *B32B 3/30* (2013.01); *B29C 48/002* (2019.02); *B29C 48/08* (2019.02); *B29C 48/21* (2019.02); *B29C 48/914* (2019.02); *B32B 5/02* (2013.01); *B32B 7/12* (2013.01); *B32B 27/12* (2013.01); *B32B 27/36* (2013.01); *B32B 2255/10* (2013.01); *B32B 2255/205* (2013.01); *B32B 2307/304* (2013.01); *B32B 2307/732* (2013.01)

(58) Field of Classification Search
CPC .... B32B 3/30; B32B 5/02; B32B 7/12; B32B 27/12; B32B 27/36; B32B 2255/10; B32B 2255/205; B32B 2307/304; B32B 2307/732; B29C 48/914; B29C 48/002; B29C 48/08; B29C 48/21
See application file for complete search history.

(56) References Cited

U.S. PATENT DOCUMENTS

| | | |
|---|---|---|
| 4,186,781 A | 2/1980 | Kim et al. |
| 4,280,978 A | 7/1981 | Dannheim et al. |

(Continued)

FOREIGN PATENT DOCUMENTS

| | | |
|---|---|---|
| DE | 102007062123 A1 | 6/2009 |
| EP | 0339079 B1 | 2/1997 |

(Continued)

OTHER PUBLICATIONS

Peng et al., "Micro Hot Embossing of Thermoplastic Polymers: A Review", Journal of Micromechanics and Microengineering, vol. 24, Issue 1, 13 pages, Jan. 2014.(English Abstract only).

(Continued)

*Primary Examiner* — Alicia J Weydemeyer
*Assistant Examiner* — Laura B Figg
(74) *Attorney, Agent, or Firm* — ADLER POLLOCK & SHEEHAN P.C.

(57) ABSTRACT

A polymer embossing-tool shim laminate includes a micro-embossed polymeric surface texture with a three-dimensional geometric pattern cured on a polymeric insulator film. The embossing-tool laminate enables methods of producing polymeric laminates with micro-sized, three-dimensional geometric patterns on their surfaces.

6 Claims, 4 Drawing Sheets

(51) Int. Cl.
*B32B 5/02* (2006.01)
*B32B 7/12* (2006.01)
*B32B 27/12* (2006.01)
*B32B 27/36* (2006.01)

(56) References Cited

U.S. PATENT DOCUMENTS

| | | | |
|---|---|---|---|
| 4,842,794 | A | 6/1989 | Hovis et al. |
| 4,923,572 | A * | 5/1990 | Watkins ............... B29C 59/002 |
| | | | 205/73 |
| 5,336,452 | A | 8/1994 | Cohen et al. |
| 6,258,308 | B1 | 7/2001 | Brady et al. |
| 6,974,609 | B2 | 12/2005 | Engle et al. |
| 7,678,443 | B2 | 3/2010 | Schulz et al. |
| 8,182,728 | B2 | 5/2012 | Cree et al. |
| 8,371,215 | B2 | 2/2013 | Rinko |
| 2004/0031404 | A1* | 2/2004 | Dixon ................... G03H 1/028 |
| | | | 101/3.1 |
| 2005/0082699 | A1* | 4/2005 | Dixon ................... B41C 1/182 |
| | | | 205/70 |
| 2005/0150589 | A1 | 7/2005 | Amos et al. |
| 2005/0239935 | A1 | 10/2005 | Kang et al. |
| 2005/0280182 | A1 | 12/2005 | Boegli |
| 2009/0110804 | A1 | 4/2009 | Ogawa et al. |
| 2012/0199994 | A1 | 8/2012 | Richert et al. |
| 2016/0059512 | A1 | 3/2016 | Proksch et al. |
| 2016/0107371 | A1 | 4/2016 | Hurme et al. |

FOREIGN PATENT DOCUMENTS

| | | |
|---|---|---|
| EP | 0802069 A1 | 10/1997 |
| EP | 1463618 A1 | 10/2004 |
| IN | 323327 | 10/2019 |
| JP | 2013244671 A | 12/2013 |
| KR | 100516276 B1 | 9/2005 |
| KR | 101811558 B1 | 12/2017 |

OTHER PUBLICATIONS

International Search Report and Written Opinion received in International Application No. PCT/US2021/038064, mailed on Oct. 19, 2021, 15 pages.

"Extended European Search Report received for European Patent Application No. 21842244.2, mailed on Jun. 17, 2024", 9 pages.

* cited by examiner

MICRO EMBOSSING

CROSS REFERENCE TO RELATED APPLICATIONS

This application claims benefit from U.S. Provisional Patent Application Ser. No. 63/052,554, filed Jul. 16, 2020, and U.S. Provisional Patent Application Ser. No. 63/115,859, filed Nov. 19, 2020, which are both incorporated by reference in their entireties.

BACKGROUND OF THE INVENTION

The present invention relates generally to extrusion, and more particularly to micro embossing.

In general, in a typical extrusion manufacturing process, plastic is heated and conveyed through a heated barrel by a screw. The plastic is forced through a die that creates the final shape of the part and the extruded plastic is cooled.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a laminate including a micro-embossed polymeric surface texture with a three-dimensional geometric pattern cured on a polymeric insulator film.

In another aspect, the invention features a thermoplastic polymeric laminate including a micro-embossed surface texture with a three-dimensional geometric pattern.

In another aspect, the invention features a method of producing a laminate, the method including arranging a metal micro-embossed surface texture with a three-dimensional geometric pattern having a thickness of less than 10 mils and a thermally stable adhesive layer underneath, providing at least one thermoplastic insulator layer underneath having a thickness of less than 15 mils, allowing a hot extruded thermoplastic melt layer to instantly heat the metal micro-embossed surface texture upon contact and forming a frozen skin on a molten thermoplastic polymer surface, controlling an effective transfer by setting the molten thermoplastic polymer's melt temperature, thickness, roll cooling temperatures and line speed to balance with a heat transfer rate through a thickness of the molten thermoplastic polymer insulator, providing a thermally stable adhesive layer underneath, and providing an extrusion cooling roll or a metal sleeve on a cooling role underneath.

In still another aspect, the invention features a method of producing a polymeric laminate, the method including arranging a polymeric embossing tool-shim laminate with a three-dimensional geometric pattern having a thickness of less than 10 mils from UV curable polymers, providing a thermally stable adhesive layer underneath, providing at least one thermoplastic insulator layer underneath having a thickness of less than 15 mils, allowing a hot extruded thermoplastic melt layer to instantly heat a polymeric micro-embossed surface texture layer upon contact and forming a frozen skin on the thermoplastic melt layer, controlling an effective transfer via setting the polymer's melt temperature, thickness, roll cooling temperatures and line speed to balance with the heat transfer rate through a thickness of the polymer film insulator, providing a thermally stable adhesive layer underneath, and providing a carrier substrate underneath.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
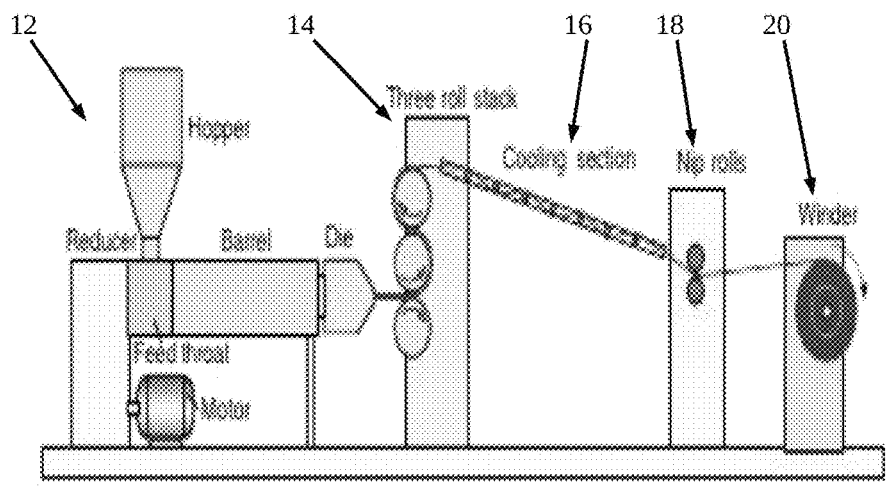
FIG. 1 illustrates an exemplary extrusion sheet line.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, an exemplary sheet line 10 includes an extruder 12, a roll stack 14, a cooling section 16, a nip/pull roll section 18 and a winder 20. In this example, the roll stack 14 contains three rolls that are often referred to as polishing rolls. They are used to exert pressure on a sheet and to impart surface conditions of the rolls to the plastic sheet. If a smooth surface is required, smooth rolls are used. If a textured surface is needed, a textured surface is used on the roll. The roll texture is the negative of the texture required on the sheet. It is possible to produce a sheet with one textured surface and the other smooth by using a smooth and a textured roll next to each other.

In one aspect, the present invention is directed towards a method of embossing fine microscopic three-dimensional geometric pattern details in a continuous cast thermoplastic extrusion process on one or both surfaces of a film or a sheet.

The method, along with an embossing tool construction, enable a creation of highly detailed, micro-scale, technical three-dimensional (3D) patterns on various thermoplastic materials using mass production extrusion processes. Before the present invention, such patterning was only possible using one-off casting of thermoset materials. The present invention solves the thermodynamic and polymer rheology challenges inherent in forming thermoplastic materials requiring high-resolution micro-embossed surface(s) on a film via a continuous nip-roll cast extrusion process.

For example, present invention includes a nip-roll process that utilizes a thin metal, specifically nickel, etched via chemical or laser to create the tooling, or "metal-tool shims," for generating microscopic geometric textures on their surface to be transferred to the extruded polymer part, in-situ, during extrusion. The fine micro-textured metal shims and the extrusion process cooling rolls are both highly conductive, which allow rapid cooling of molten polymer in the extrusion process. Hence, the cooling rolls, even with temperatures set as high as the process allows, quench the molten polymer creating a solid skin which cannot duplicate fine embossed textures.

The nip-roll process of the present invention utilizes a thin, e.g., 3-15 mil, metal-tool shim adhered via a thermally-stable pressure sensitive adhesive (PSA) or other curing adhesive to a thermal insulator. The thermal insulator can be a thermally stable cured or high-temperature rubber, elastomer, or other polymer film. For example, a 7-mil thick polyester (e.g., polyethylene terephthalate (PET)) film provides a good balance of insulation in the nip while still allowing a heat transfer rate after the nip for the extruded and embossed film to cool in sufficient time to allow set of the emboss image transfer, solidification and removal from the roll in a controlled steady-state process. The laminate of nickel metal-tool shim adhered to the PET insulator film is then adhered to the metal cooling-roll surface via PSA or other suitable thermally stable adhesive. In our process, this embossing tool shim laminate construction is adhered to a conductive metal (e.g., nickel) sleeve which can be slid over and onto the cooling roll facilitating easy addition and removal of the complete micro-embossing structure. In manufacture, this allows fast changes from one micro-structure emboss pattern to another.

Figure 2:
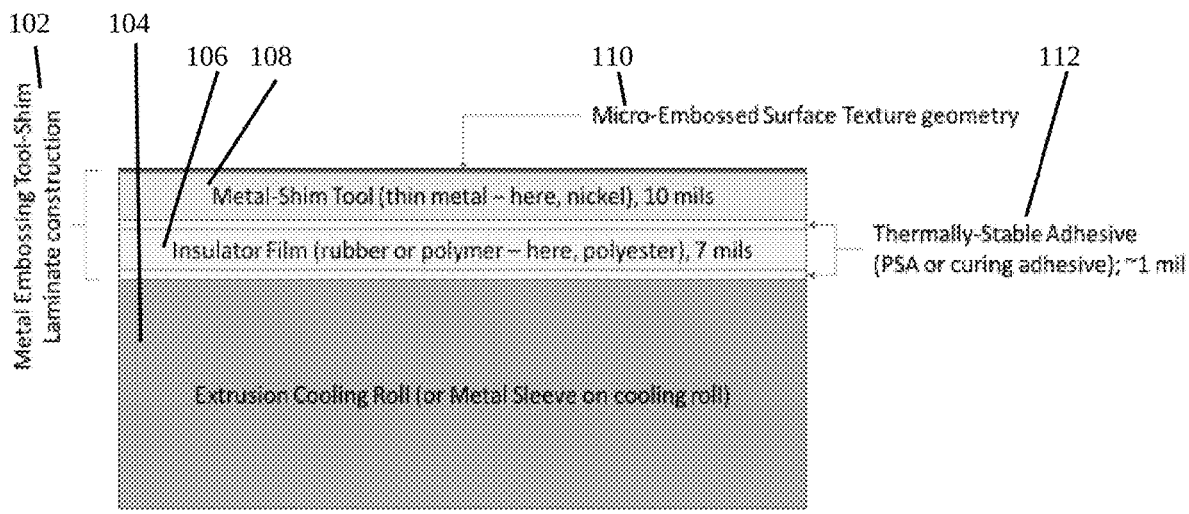
FIG. 2 illustrates an exemplary structure.

As shown in FIG. 2, an exemplary structure 100 includes a metal embossing tool-shim laminate 102 and an extrusion cooling roll 104. The metal embossing tool-shim laminate 102 includes an insulator film 106, a metal-shim tool 108 and a micro-embossed surface texture geometry 110. A thermally-stable adhesive 112 bonds the insulator film 106 to the extrusion cooling roll 104 and the insulator film 106 to the metal-shim tool 108.

Figure 3:
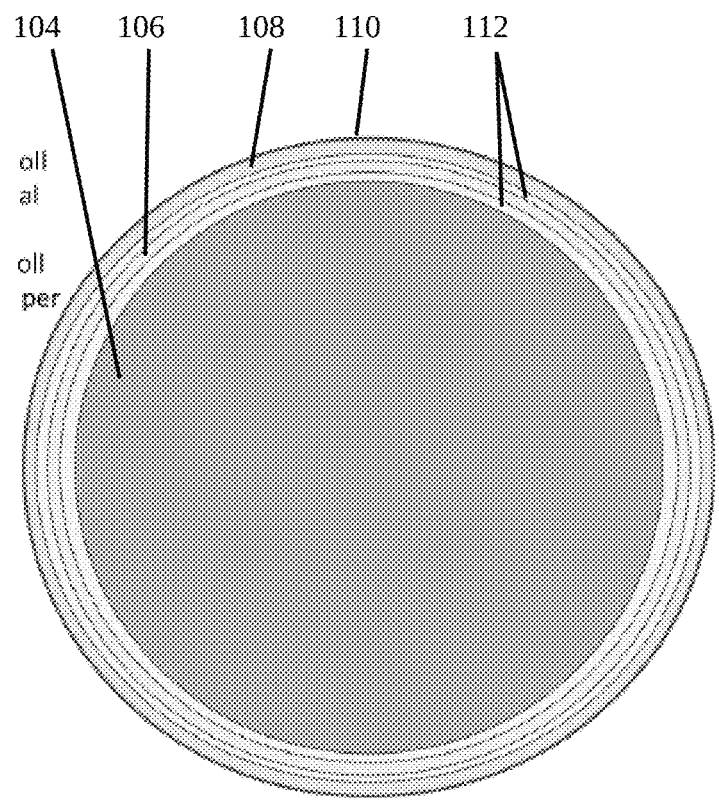
FIG. 3 illustrates a cross-section of the cooling with metal embossing tool-shim laminate.

FIG. 3 illustrates a cross-section of the cooling roll with metal embossing tool-shim laminate 102 adhered on the roll surface 104 as described with respect to FIG. 2 above.

The laminate embossing tool shim works by enabling a hot extruded thermoplastic melt to instantly heat the thin metal-tool shim layer upon contact. The PET insulative layer keeps the low cooling temperatures from the cooling roll from quickly forming a frozen skin on the molten polymer's surface. Thus, the polymer remains at a low viscosity having the ability to flow into and fully wet out the microscopic details and geometries etched into the metal shim. Because the insulator's thickness is determined by the thermodynamics of the system, it is of a gauge that allows the set cooling roll temperatures to transfer through the laminate to ultimately cool the molten polymer skin such that it sets and solidifies having replicated and transferred the shim's emboss geometry pattern and detail to the frozen skin layer. Effective transfer is controlled primarily via setting the polymer's melt temperature, thickness, roll cooling temperatures and line speed to balance with the heat transfer rate through the thickness of the PET film insulator. Changing insulator thicknesses can allow a different balance of extrusion process temperatures and line speed as well as allow different thermoplastic chemistries utility in this micro-embossing process.

Figure 4:
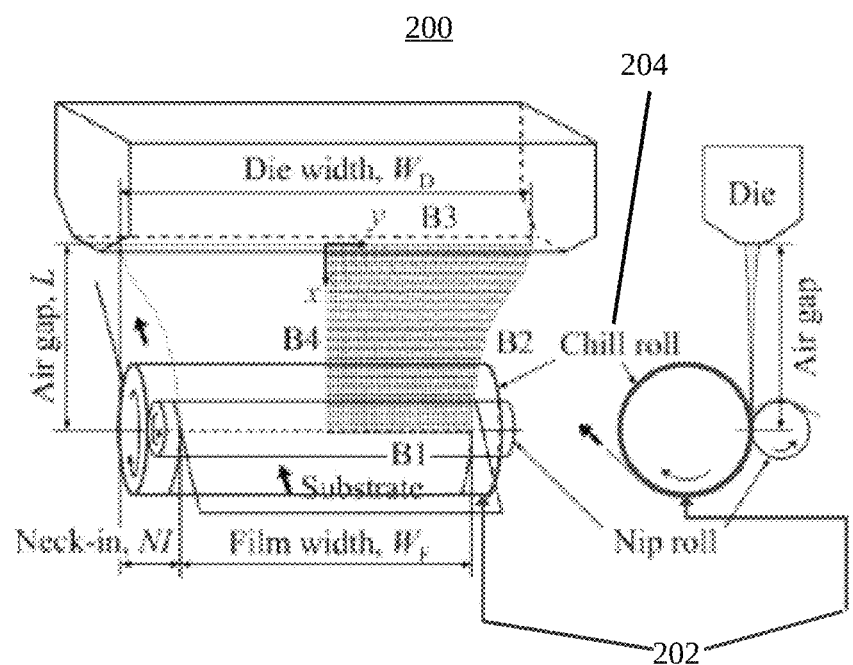
FIG. 4 illustrates an exemplary cast film extrusion system.

As shown in FIG. 4, an exemplary cast film extrusion system 200 includes a metal embossing-tool shim laminate 202 mounted on a chill roll 204.

Figure 5:
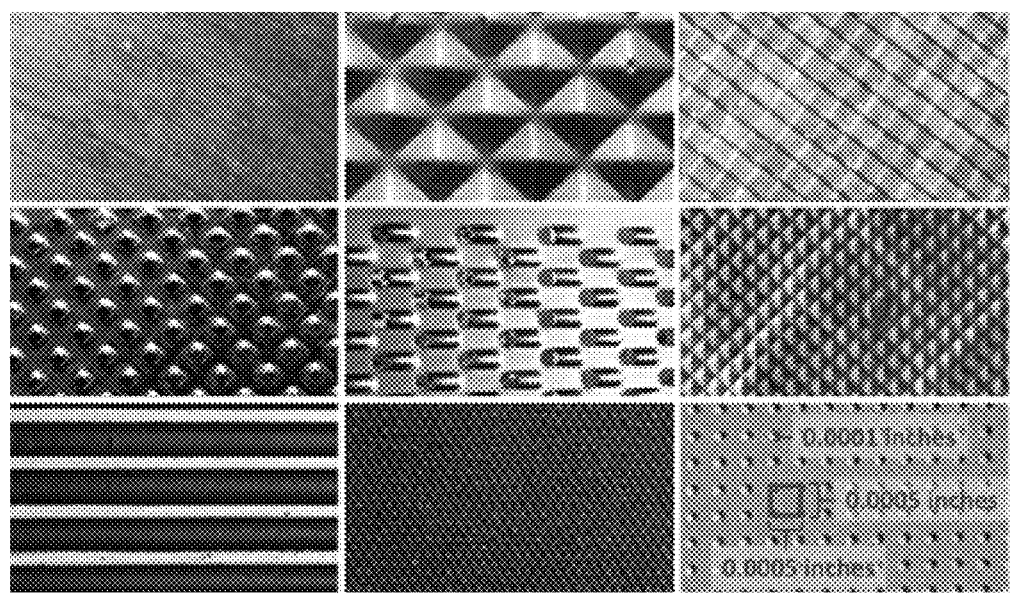
FIG. 5 illustrates nine exemplary surface embossing textures.

FIG. 5 illustrates nine exemplary surface embossing textures.

Figure 6:
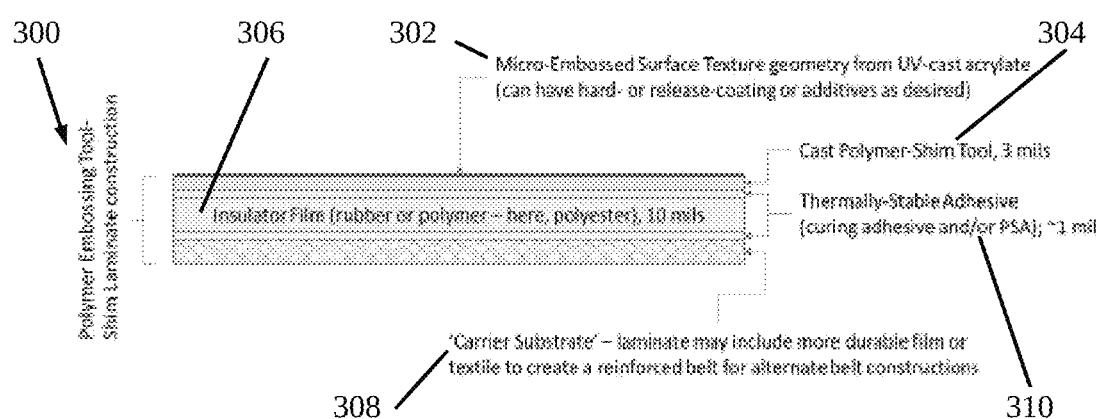
FIG. 6 illustrates another exemplary polymer embossing tool-shim laminate.

In another embodiment, a polymer embossing tool-shim laminate 300 is made without a nickel or metal shim as shown in FIG. 6. Here, the polymer embossing tool-shim laminate 300 includes a micro-embossed surface texture geometry 302 on a cast polymer-shim tool 304, an insulator film 306, a carrier substrate 308 and thermally stable adhesive 310. Alternately, the polymer embossing tool-shim laminate on the insulator film can be mounted by a thermally stable adhesive to the cooling roll as is done with the metal shim construction as opposed to mounting on a carrier substrate to make a belt.

The polymer-shim laminate tool, or "belt," enables fast, continuous in-process replication to occur in the roll nip during film extrusion. The polymer shim tool, being made of UV-cured acrylate polymers on polymer film, acts as a thermal insulator, mitigating the quenching/skinning effect that occurs with conductive metal rolls and/or shims as described above. Because the surface of the very hot, extruded melt web is now insulated from quenching and rapidly skinning on cold metal from the chill roll, the extruded polymer's viscosity remains low enough to flow into and wet out the fine micro-embossed cured-acrylate shim detail. In fact, the greatest heat in the extrusion process comes from melting the plastic in the extrusion barrel usually in excess of 400° F. The extruded hot melt itself becomes an efficient means to bring that heat into the nip roll station versus other external sources of heat. In this way, a thin polymer melt web can be extruded onto the polymer tool-shim surface to continuously manufacture a micro-embossed thermoplastic film. One can also make a long, continuous and flexible/rollable "belt" of UV-cured acrylate shim stock. Unwinding this rolled acrylate shim belt through the nip onto the chill roll insulates the extruded melt from the cooling roll and transfers its surface emboss to the extruded molten polymer in process. This cured-acrylate belt shim can also be used in heat/pressure/time-controlled lamination processes such as belt lamination, press lamination and others. Because the acrylate polymer shim tools are relatively thin, they effectively insulate the instant the hot melt contacts their surface, but eventually allow the colder roll temperatures to transfer to the extruded melt. As the melt cools it creates a skin, setting the emboss as it wraps around the cooling roll and is released as solid embossed film. To make the process of micro-embossing with a polymer-shim tool laminate durable for continuous production runs, the thermoplastic film made from the polymer-shim tool can be made into a long roll that is unwound through the nip station, re-spooled, and re-used as a forming tool in the nip.

Figure 7:
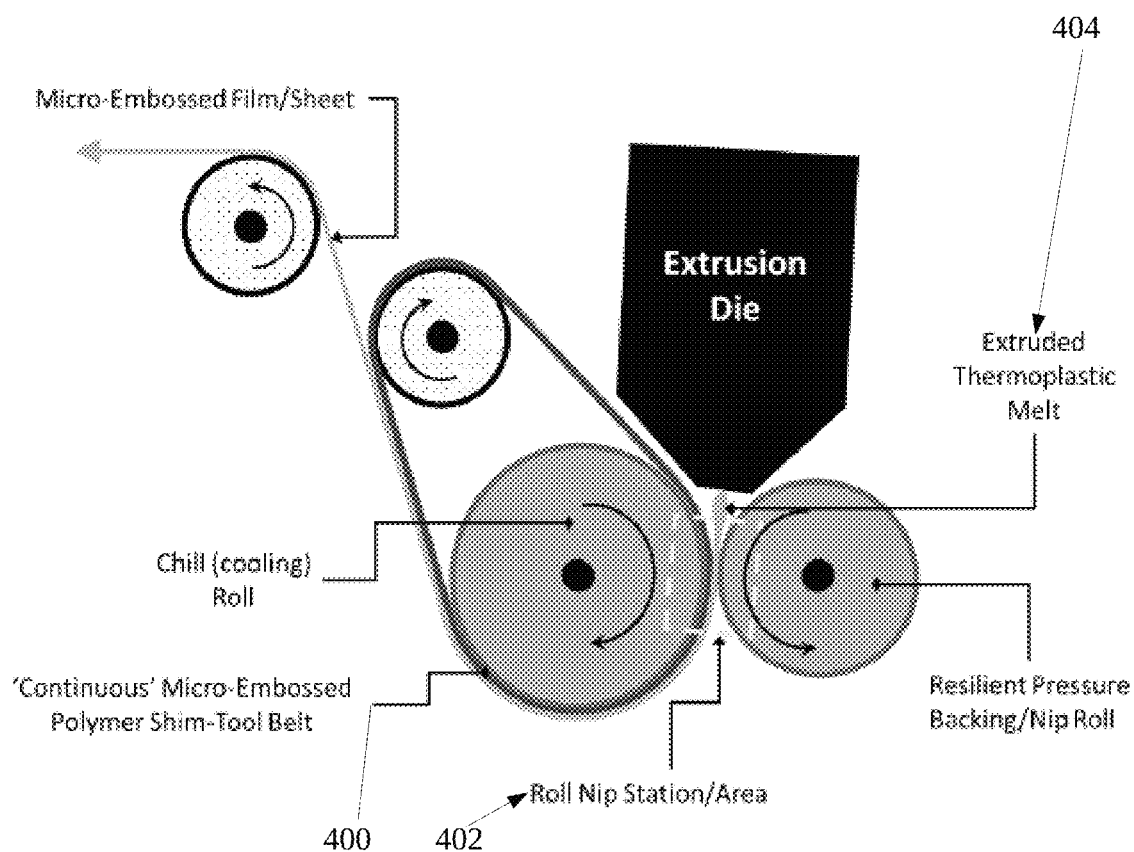
FIG. 7 illustrates an alternate embodiment of a polymer-shim tool belt.

As shown in FIG. 7, an alternate embodiment includes making a polymer-shim tool belt 400 by splicing the ends of a determined length of the metal- or polymer-shim tool strips into a continuous loop. Any section of the belt 400 then has substantially less duration in the nip station 402 at high temperatures and pressures, and also has a longer and controllable cooling time for the solid extruded web skin to form, cool, and be released from the metal or polymer shim-tool's micro-embossed surface. The melt (or web) 404 is cooled, on one or both sides using a metal or polymer tool shim (e.g., gloss and/or textured rollers, belts, or thermally stable, flexible films, sheets or embossing papers) that transfer the texture from the patterned "tool" to the hot extruded polymer web 404. It is common practice to apply such textures for aesthetic or functional improvements when extruding molten polymer webs by such tools in the cast thermoplastic extrusion process. Macro-scale surface patterns can be created to provide properties such as a glossy surface, a "sand-blasted" matte surface, a leather or wood grain, or any other custom pattern. These patterns can be transferred from a tool to the molten web and cooled in place continuously in the extrusion process. Similarly, the emboss can be applied post extrusion by pre-heating the polymer surface to a formable state and subsequently passing the extruded polymer film or sheet through heated and cooled rollers, belts, thermally stable forming sheets or films in a post-embossing process or laminating press using heat and pressure. Via these processes obtaining accurate optically true replication of surfaces below 5 mils (0.005") is not possible at a speed and scale suitable for the cost demands of mass producing certain thermoplastic parts.

Unique to all thermoplastic polymer molding and forming processes is the need to bring the polymer material up to a temperature at which the polymer can move or flow to be deformed and subsequently conformed into a "mold" of desirable geometry or in this case, fine-patterned surface texture. One challenge with all viscous, non-Newtonian, thermoplastic materials in molding processes is applying and maintaining the right heat and forming forces that avoid degradation of polymer properties or of its shaping efforts while also providing enough time to cool and freeze the desired formed shape or texture within reasonable cycle times. The cooling time requires heat to be removed from a molten polymer so it will remain a formed solid when removed from the forming tool without warping or deforming. In the discontinuous injection molding process, the polymer melt temperature, injection speed, tool temperature, and cooling times can be individually set and managed to allow close control of polymer rheology and flow—which in turn provides fine (even microscopic) control of molding geometry and textures. Controlling the rheology of the polymer melt under very high injection molding pressures (e.g., 20,000 psi) ensures complete "wet out" of all the geometry details and surfaces before the polymer begins cooling. Once cooling, a polymer melt rapidly increases in viscosity and develops a solid rigid skin which will not conform to fine microscopic texture details without excessive forces or reapplication of heat.

In the continuous extrusion process all these thermal polymer flow controls (e.g., melt temperature, tool/roll temperature, and viscous shear thinning) are more intricately connected and more difficult to independently control as compared to injection molding. For example, the most effective means to lower the viscosity of a thermoplastic polymer melt is via shear which orients the material's polymer chain structure greatly reducing the melts resistance to pressure flow. In molding, this is readily achieved via injection speed and pressure but in extrusion shear flow forces are an order of magnitude less. Hence, the low viscosity desired in the polymer melt for achieving intimate surface wet out of a texture in the extrusion process is almost solely determined by melt temperature. To a lesser degree, tool temperature can be used to slow a melt's cooling rate. Thus, a higher tool/roll temperature will improve a material's ability to flow and wet out texture. However, the nip rollers (or belts over rolls) in an extrusion process also function to cool the polymer melt to a stable solid before the extruded web, now a "finished" cooled film or sheet, can be released from the textured roll without deforming, shrinking or warping when no longer fixed against the roll texture. Because of this the roll temperature must be run below the melt temperature of the polymer so that the melt may solidify into a formed film. And in practice, it must be run significantly below the melt temperature at a point where the polymer melt is solidified and stable in final form and texture so it is not stretched by process tensions nor by shrinking and warping upon removal from the tool and tension at cost-effective process speeds.

This means that the tool temperature needs to be set to allow enough time to remove the heat from the polymer melt (which is significantly high to allow excellent flow and wet out into the fine tool texture) before the extruded web is cooled to solid form and removed from the forming roll. The "cooling time" in contact with the cooling rolls or belts is fixed by the extrusion line speed. Running the line slower allows the operator more time to remove heat and hence the ability to run hotter rolls to achieve better flow into a roll texture. However, reducing the speed creates a penalty in cost and efficiency as well as a loss of process control and stability if too slow. In practice, the process cannot be run slow enough to give more than a few seconds of inadequate cooling time for image transfer. More desirable is to run the rolls cold with a hot, easy-flowing polymer melt that will set up quickly allowing higher yield and easy removal of a stable formed film or sheet product.

However, running a hot melt and colder rolls quenches the polymer melt surface once it touches the cooling rolls. Polymer melts cool from the outside in and as such once a hot polymer surface touches a colder surface below its thermal softening point it quenches to a solid creating a "polymer skin." Polymers are excellent thermal insulators. Once a solid polymer skin is formed the remaining mass of polymer is effectively well insulated from the effect of the cooling rolls. Additionally, the solid skin does not flow and the viscosity of the quenching melt behind it increases rapidly, becoming stiffer with this quench cooling of the melt surface.

The embossing tool-shim laminate construction of the present invention enables the creation of controllable, micro-scale surface patterns on the surfaces of films manufactured using conventional, production-scale extrusion processes; it is simple, cost-effective, and efficient.

The present invention, described above, provides a suitable balance of temperature, flow and cooling, thus enabling the production of controllable, microscopic, fine-detailed geometries from an embossed tool or roll on to one or both sides of a thermoplastic polymer web. Constructions and materials different than those described in the herein could not achieve a suitable balance of temperature, flow and cooling—and therefore could not reliably produce the desired microscopic, fine-detailed geometries. "Spot" heating the embossed rolls or shims just prior to "nipping" the polymer web between two cooling/forming rolls demonstrated we could improve the wet out and transfer of an impression from the roll to the polymer melt, but processing issues (e.g., hot polymer sticking to and wrapping process rolls and instability processing quality film) render such solutions expensive, complicated and inefficient.

The present invention also offers significant advantages over shim tools made via casting a polymer (e.g., UV-curable acrylate polymers sometimes with various cured hard and/or release coatings and additives) and curing it on an etched-metal shim to use as an embossing tool to transfer fine micro-embossed patterns. Although thermoset and UV-casting can be used to make polymer micro-textured films and sheets, the method is an additional step, slow and expensive. While this approach solves the complicated polymer rheology and thermal dynamics problem of the extrusion process, the polymer shims degrade in the nip under high cyclical temperatures, pressures, fatigue and shear in the nip. Using a long, UV-cured polymer shim belt can allow for longer runs—but the belts are ultimately finite in length thus requiring multiple shim belts to be rotated into service to maintain continuous extrusion over manufacturing shifts—again adding complexity and cost to the manufacturing process.

Cooling rolls having roll covers of less conductive materials (e.g., thermally-stable cured rubbers and/or elastomers) were considered as alternative materials but the process of etching or otherwise creating the fine texture on their surface does not currently exist. The use of rubber rolls is further complicated because their primary role is to cool the polymer melt but since the rubber rolls are less conductive, precise thermal control in the nip during extrusion is difficult if not impossible—and would require the process to be run too slowly to be practical.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A metal embossing tool-shim laminate comprising:
   a metal etched with three-dimensional structures having a thickness of less than 15 mils;
   a polymeric insulator film; and
   a first thermally-stable pressure sensitive adhesive having a thickness of 1 mil, the metal etched with three-dimensional structures bonded to the polymeric insulator film by the first pressure sensitive adhesive.

2. The metal embossing tool-shim laminate of claim of 1 wherein the metal etched with three-dimensional structures has a thickness of 10 mils or less.

3. The metal embossing tool-shim laminate of claim of 1 wherein the polymeric insulator film has a thickness of 1 mil.

4. The metal embossing tool-shim laminate of claim of 3 further comprising a nip roll, the nip roll bonded to the polymeric insulator film by a second first thermally-stable pressure sensitive adhesive.

5. The metal embossing tool-shim laminate of claim of 4 wherein the nip roll is a thermally-controlled extrusion cooling roll.

6. The metal embossing tool-shim laminate of claim of 3 wherein the polymeric insulator film is selected from the polymer group consisting of polyesters, polyamides, polyurethanes, polycarbonates, polyester elastomers, polyamide elastomers, polyurethanes, polymethyacrylates, polymethyl methacrylates, engineering thermoplastic materials, PBT, polysulfones, PEEK, polyimides, thermoplastic elastomers, thermoplastic vulcanized rubbers, olefinic homo and copolymers and blends thereof.

* * * * *